US 12,545,597 B2

(12) United States Patent
Lindstrom et al.

(10) Patent No.: US 12,545,597 B2
(45) Date of Patent: Feb. 10, 2026

(54) METHODS AND SYSTEMS FOR SENSOR FOULING MITIGATION (71) Applicant: SMARTWASH SOLUTIONS, LLC, Salinas, CA (US)

(72) Inventors: Danny Elmer Lindstrom, Salinas, CA (US); Christopher Michael McGinnis, Seaside, CA (US); Eric Child Wilhelmsen, Milpitas, CA (US)

(73) Assignee: SmartWash Solutions, LLC, Salinas, CA (US)

( * ) Notice: Subject to any disclaimer, the term of this patent is extended or adjusted under 35 U.S.C. 154(b) by 1058 days.

(21) Appl. No.: 17/045,749

(22) PCT Filed: Apr. 10, 2019

(86) PCT No.: PCT/US2019/026808
§ 371 (c)(1),
(2) Date: Oct. 6, 2020

(87) PCT Pub. No.: WO2019/204099
PCT Pub. Date: Oct. 24, 2019

(65) Prior Publication Data
US 2021/0053842 A1  Feb. 25, 2021

Related U.S. Application Data (60) Provisional application No. 62/658,672, filed on Apr. 17, 2018.

(51) Int. Cl.
*C02F 1/00* (2023.01)
*C02F 1/66* (2023.01)
(Continued)

(52) U.S. Cl.
CPC .............. *C02F 1/008* (2013.01); *C02F 1/66* (2013.01); *G01N 17/008* (2013.01);
(Continued)

(58) Field of Classification Search
CPC .... C02F 1/008; C02F 1/66; C02F 1/76; C02F 2209/02; C02F 2209/06; C02F 2103/32;
(Continued)

(56) References Cited

U.S. PATENT DOCUMENTS 3,681,025 A   8/1972 Dalgaard
4,427,772 A   1/1984 Kodera et al.
(Continued)

FOREIGN PATENT DOCUMENTS

DE   202015101756 U1   7/2016
GB       2319614 A    5/1998
(Continued)

OTHER PUBLICATIONS

FSIS Compliance Guide: Modernization of Poultry Slaughter Inpsection: Chilling Requirements (Year: 2014).*
(Continued)

*Primary Examiner* — Brendan A Hensel
(74) *Attorney, Agent, or Firm* — Patterson + Sheridan, LLP (57) ABSTRACT Methods and apparatus for monitoring process water within a food processing system are provided. One example water control system for a food processing system generally includes a temperature adjustment element having an inlet and an outlet and a sensor coupled to the outlet of the temperature adjust element. The temperature adjustment element is configured to: receive, at the inlet, a portion of process water from a process water supply in a stage of the food processing system, the process water in the process water supply and the received portion of the process water having a first temperature; and cause the portion of the process water at the outlet to have a second temperature, different from the first temperature. The sensor is configured to measure at least one property of the portion of the process (Continued)

water received from the outlet of the temperature adjustment element.

18 Claims, 4 Drawing Sheets

(51) Int. Cl.
*C02F 1/76* (2023.01)
*G01N 17/00* (2006.01)
*G01N 33/18* (2006.01)

(52) U.S. Cl.
CPC ............ *G01N 33/1893* (2013.01); *C02F 1/76* (2013.01); *C02F 2209/02* (2013.01); *C02F 2209/06* (2013.01)

(58) Field of Classification Search
CPC .. C02F 2209/29; C02F 2303/22; C02F 1/004; C02F 1/686; C02F 2209/008; C02F 2303/14; G01N 17/008; G01N 33/1893; G01N 27/38
See application file for complete search history.

(56) References Cited

U.S. PATENT DOCUMENTS

| | | | |
|---|---|---|---|
| 5,462,678 | A | 10/1995 | Rosaen |
| 5,697,366 | A | 12/1997 | Kimball et al. |
| 6,438,501 | B1 | 8/2002 | Szecsody et al. |
| 6,605,253 | B1 * | 8/2003 | Perkins .................. A23B 4/30 426/321 |
| 7,857,506 | B2 | 12/2010 | Schick et al. |
| 2007/0082405 | A1 | 4/2007 | Rigsby |
| 2007/0163966 | A1 * | 7/2007 | Hilgren .................. C02F 1/32 210/764 |
| 2008/0067135 | A1 * | 3/2008 | Stanford .................. C02F 1/76 210/754 |
| 2010/0047414 | A1 | 2/2010 | Terranova |
| 2011/0008866 | A1 | 1/2011 | Dibel et al. |
| 2011/0247655 | A1 | 10/2011 | Lewis et al. |
| 2012/0000488 | A1 | 1/2012 | Herdt et al. |
| 2014/0026971 | A1 * | 1/2014 | Roach .................. C02F 1/4674 204/229.8 |
| 2018/0093901 | A1 | 4/2018 | Brennan et al. |
| 2019/0037864 | A1 * | 2/2019 | Lytle .................. A22C 17/08 |

FOREIGN PATENT DOCUMENTS

| | | |
|---|---|---|
| KR | 100742843 B1 | 7/2007 |
| WO | 2003065032 A2 | 8/2003 |
| WO | 2006043900 A1 | 4/2006 |
| WO | 2010045362 A2 | 4/2010 |
| WO | 2011001335 A1 | 1/2011 |
| WO | 2016013586 A1 | 1/2016 |
| WO | 2016087866 A1 | 6/2016 |

OTHER PUBLICATIONS

PH Meter: Wikipedia (July) (Year: 2017).*
PCT International Search Report and Written Opinion for PCT/US2019/026808, Dated Jul. 4, 2019.
Canadian Examination Report dated Nov. 4, 2021, for Canadian Patent Application No. 3,097,366.
European Search Report issued in 15848296.8 on Apr. 25, 2018.
European Search Report issued in 17859030.3 on May 26, 2020.
International Search Report/Written Opinion dated issued in PCT/US2017/054960 on Dec. 11, 2017.
Mexican Office Action dated Oct. 23, 2024, for Mexican Patent Application No. MX/a/2020/010869.

* cited by examiner

METHODS AND SYSTEMS FOR SENSOR FOULING MITIGATION

CROSS-REFERENCE TO RELATED APPLICATIONS

This application is a national stage application under 35 U.S.C. 371 of International Application No. PCT/US2019/026808, filed Apr. 10, 2019, which claims the benefit of priority to U.S. Provisional Application No. 62/658,672, filed Apr. 17, 2018, which are both assigned to the assignee hereof and hereby expressly incorporated by reference herein in their entireties as if fully set forth below and for all applicable purposes.

BACKGROUND

Technical Field

Apparatus and methods of the present disclosure relate to reducing the fouling or other effects upon sensors associated with adhering material, particularly lipids.

Description of the Related Art

Many foods are processed with two-stage washing in food processing systems. Repeating the same wash a third time generally yields no further benefits if the first two stages have been properly managed. For example, a primary wash system may remove dirt and debris. The primary wash system may also handle the bulk of the soluble organic load from any cutting or chopping operation. The secondary wash, whose water chemistry is generally easier to manage, is intended to complete the sanitation of the product. In recent years, improved control of the water chemistry of process water used in both the primary and secondary wash systems has led to improvements in the sanitation of washed products and the control of cross-contamination; however, more improvement is still desirable to better mitigate microbial risk to consumers.

Engineering efforts have produced various flumes and tanks to provide agitation and mechanical action to enhance the sanitation process. For example, air jets and turbulence are designed into many systems. None of these designs has been so overwhelmingly successful that all previous equipment designs were superseded. In some cases, different designs are preferred for certain product types for quality reasons. For these and other reasons, the food processing industry includes a wide variety of equipment.

Sensors, such as electrodes, are used to monitor various attributes of process and waste water and solutions, particularly in the food processing industry. The sensors may be in direct contact with the solution, or indirectly in contact with the solution through an interface or window. Sensors used to measure chlorine concentration and acidity (e.g., pH) of a solution are examples of sensors that may be in direct contact with the solution. As an example of indirect contact, the property of turbidity may be measured optically through a window by a sensor. The property of dissolved oxygen in a solution is often measured by a sensor (e.g., an oxygen electrode) behind a permeable membrane. The property of conductance of the solution may be measured directly by a sensor contacting the solution. These examples are not an exhaustive list. Sensors and the associated interfaces and/or windows can be subject to fouling or other detrimental effects, which limit the performance of the sensors and may make mitigation (e.g., cleaning) desirable. This is particularly the case with lipids (e.g., oils, fats, and other organic compounds), as lipids suspended in the solution may reduce the effectiveness of previously known anti-fouling measures.

SUMMARY

The systems, methods, apparatus, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved food safety.

Certain aspects of the present disclosure provide a water control system in a food processing system. The water control system generally includes a temperature adjustment element having an inlet and an outlet and a sensor coupled to the outlet of the temperature adjustment element. The temperature adjustment element is generally configured to: receive, at the inlet of the temperature adjustment element, a portion of process water from a process water supply in a stage of the food processing system, the process water in the process water supply and the received portion of the process water having a first temperature; and cause the portion of the process water at the outlet of the temperature adjustment element to have a second temperature, different from the first temperature. The sensor is generally configured to measure at least one property of the portion of the process water received from the outlet of the temperature adjustment element.

Certain aspects of the present disclosure provide a method of sensing a fluid with mitigated sensor fouling. The method generally includes receiving a portion of process water from a process water supply in a stage of a food processing system, the process water in the process water supply and the received portion of the process water having a first temperature; causing the portion of the process water to have a second temperature, different from the first temperature; and measuring at least one property of the portion of the process water at the second temperature.

Certain aspects of the present disclosure provide a food processing system. The food processing system generally includes at least one stage for processing a food product; a process water supply configured to supply process water to the stage of the food processing system, the process water having a first temperature in the stage; a temperature adjustment element having an inlet and an outlet, and a sensor coupled to the outlet of the temperature adjustment element. The temperature adjustment element is generally configured to: receive, at the inlet of the temperature adjustment element, a portion of the process water from the process water supply, the received portion of the process water also having the first temperature; and cause the portion of the process water at the outlet of the temperature adjustment element to have a second temperature, different from the first temperature. The sensor is generally configured to measure at least one property of the portion of the process water received from the outlet of the temperature adjustment element.

Certain aspects of the present disclosure provide a water control system for use in a food processing system. The water control system generally includes a process water monitoring flow path in fluid communication with a process water supply of the food processing system, a sensor to receive process water from the process water monitoring flow path and measure a property with respect to the process water, and a temperature adjustment element positioned between the process water monitoring flow path and the sensor to adjust a temperature of the process water within the process water monitoring flow path received by the sensor.

Certain aspects of the present disclosure provide a water control system for use in a food processing system. The water control system generally includes a sensor to receive process water from the food processing system and measure a property with respect to the process water, and a temperature adjustment element positioned upstream of the sensor to adjust a temperature of the process water received by the sensor.

Certain aspects of the present disclosure provide a food processing system. The food processing system includes a food processing stage that processes food with process water from a process water supply, a process water supply pump to pump the process water from the process water supply to the food processing stage, a process water supply cooling element to cool the process water in the process water supply, a sensor to receive the process water from the process water supply and measure a property with respect to the process water, and a temperature adjustment element positioned upstream of the sensor to adjust a temperature of the process water received by the sensor.

Certain aspects of the present disclosure provide a method to measure a property of process water. The method includes receiving the process water from a food processing system, adjusting a temperature of the received process water, and measuring the property of the temperature adjusted process water.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Aspects of the present disclosure provide apparatus, systems, and methods, for monitoring process water within a food processing system. One example food processing system generally includes a process water supply configured to supply process water to a stage of the food processing system, the process water having a first temperature (i.e., a temperature suitable for processing food) in the stage; a temperature adjustment element (e.g., a heater or a chiller) having an inlet and an outlet, the temperature adjustment element being configured to: receive a portion of the process water from the process water supply at the inlet, the received portion of the process water having the first temperature; and cause the portion of the process water at the outlet to have a second temperature, different from the first temperature; and a sensor positioned to receive a portion of the process water from the process water supply and measure a property (e.g., pH or chlorine concentration) of the portion of the process water.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

As shown and described herein, various features of the disclosure will be presented. Various embodiments may have the same or similar features, and thus, the same or similar features may be labeled with the same reference numeral. Although similar reference numbers may be used in a generic sense, various embodiments will be described and various features may include changes, alterations, modifications, etc. as would be appreciated by those of skill in the art, whether explicitly described or otherwise.

Examples of Process Water Monitoring Flow Path and Food Processing System

Embodiments of the present disclosure generally relate to the mitigation or controlling of the fouling or other effects on sensors and electrodes measuring properties of process water, especially effects associated with adhering material, such as lipids. Accordingly, the present disclosure relates to a water control system or method for use in a food processing system that includes a sensor and a temperature adjustment element. The sensor is used to receive process water from the food processing system and measure a property (e.g., chlorine concentration or pH) with respect to the process water. The temperature adjustment element is positioned upstream of the sensor to adjust a temperature of the process water received by the sensor. Adjusting the temperature of the process water may mitigate the fouling or other effects on the sensor, especially those caused by lipids contained within the process water.

The food processing system may include a process water monitoring flow path in fluid communication with a process water supply of the food processing system. For example, the process water supply may refer to a tank or reservoir of the process water used within the food processing system, or may refer generally to the process water used within and circulated throughout the food processing system, particularly in an embodiment in which the food processing system does not include a tank or reservoir for containing, at least temporarily, the process water. The temperature adjustment element may then be positioned between the process water monitoring flow path or the process water supply and the sensor to adjust a temperature of the process water before reaching the sensor.

The food processing system may further include other elements related to a food processing system, such as a food processing stage (e.g., a food washing stage) that processes food with process water from the process water supply, and a process water supply pump to pump the process water from the process water supply along a wash line flow path to the food processing stage. The process water supply may be used to receive process water downstream from the food processing stage with the process water recirculated to the food processing stage using the pump. Further, the food processing system may include a process water supply cooling element, such as a chiller, to cool the process water in the process water supply. The process water supply cooling element may be separate and distinct from the temperature adjustment element.

Though the present disclosure is not so limited, the food processing system may be used for processing protein-rich foods or dairy products. In particular, though others types of foods may be used in accordance with the present disclosure, the food processing stage may be used to process fish, poultry, or other types of meat in one or more embodiments.

Figure 1:
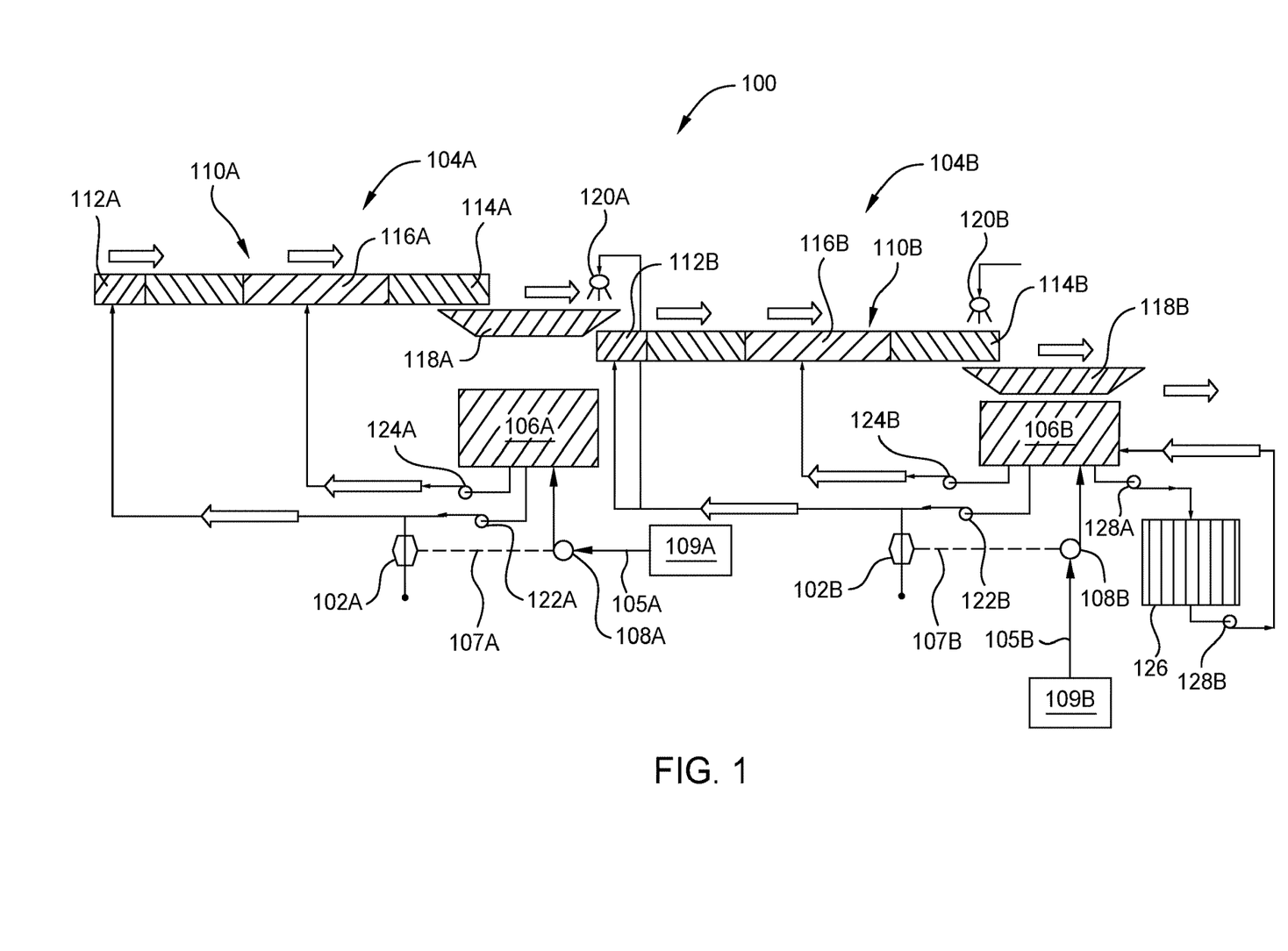
FIG. 1 is a block diagram of a control system for water used in food product processing that includes a water control system and product wash equipment, in accordance with certain aspects of the present disclosure.

FIG. 1 is a schematic diagram of a food processing system 100 including one or more water control or monitoring systems 102A and 102B in accordance with aspects of the present disclosure. In particular, the food processing system 100 includes a first water control system 102A and a second water control system 102B in this embodiment, though additional or fewer water control systems may be used without departing from the scope of the present disclosure. The water control systems 102A and 102B are used to monitor and control process water used within the food processing system 100.

The food processing system 100 further includes a first food processing stage 104A and a second food processing stage 104B, though additional or fewer food processing stages may be used without departing from the scope of the present disclosure. Further, the first food processing stage 104A is shown as being upstream of the second food processing stage 104B with respect to the flow or processing of food through the food processing system 100. As shown and discussed within the description below, the food processing stages 104A and 104B generally include similar elements and configurations. However, the present disclosure is not so limited, as different elements and configurations may be used for each food processing stage without departing from the present disclosure.

The food processing system 100 uses process water (e.g., a water-based solution with additional chemical additives) to process and wash food. As shown, one or both of the food processing stages 104A and 104B may include process water supplies 106A and 106B, for providing and/or containing the process water used within the food processing system 100. As discussed above, the process water supplies 106A and 106B may refer to tanks, reservoirs, and/or accumulation zones of the process water used within the food processing system 100, as shown in FIG. 1. Additionally or alternatively, a process water supply may refer generally to the process water included within and circulated throughout the food processing system 100, such as in a food processing system without a tank, reservoir, or accumulation zone. The first water control system 102A may be used with the first food processing stage 104A to monitor and control the process water used in the first water control system (e.g., supplied from the first process water supply 106A), and the second water control system 102B may be used with the second food processing stage 104B to monitor and control the process water used in the first water control system (e.g., supplied from the second process water supply 106B).

The first food processing stage 104A includes a food wash zone 110A for washing food with the process water from the process water supply 106A. Food may enter the food wash zone 110A at an entry point 112A, flow through the food wash zone 110A, and exit at an exit point 114A. The food wash zone 110A may include a turbulence zone 116A, through which the food flows, to facilitate washing of the food. A dewatering zone 118A (e.g., screening zone), downstream of the food wash zone 110A, is included within or is used in cooperation with the food processing stage 104A. When the food exits the food wash zone 110A, the food may enter the dewatering zone 118A to separate the food from the process water. The process water may then enter into the process water supply 106A, while the food may continue to the food wash zone 110B of the second food processing stage 104B. Further, when the food exits the dewatering zone 118A and/or enters the food wash zone 110B, the food may be rinsed, such as by a spray bar 120A. In this embodiment, the process water from the second process water supply 106B may be sprayed through the spray bar 120A to rinse the food entering the food wash zone 110B, though other water or the process water from the first process water supply 106A may be used to rinse the food.

Similar to the first food processing stage 104A, the second food processing stage 104B may include a food wash zone 110B for washing food with process water from the process water supply 106B. Food may enter the food wash zone 110B at an entry point 112B after exiting the dewatering zone 118A, flow through the food wash zone 110B, and exit at an exit point 114B. The food wash zone 110B may also include a turbulence zone 116B through which the food flows through to facilitate washing of the food.

A dewatering zone 118B (e.g., screening zone) is included within or is used in cooperation with the second food processing stage 104B downstream of the food wash zone 110B. When the food exits the food wash zone 110B, the food enters the dewatering zone 118B to separate the food from the process water. The process water may enter the process water supply 106B, while the food may continue further down through the food processing system 100, or may exit the food processing system 100. Further, when the food exits the food wash zone 110B and/or enters the dewatering zone 118B, the food may be rinsed, such as using a spray bar 120B. In this embodiment, fresh process water, separate from the process water supplies 106A and 106B, may be used to rinse the food. However, the present disclosure is not so limited, as process water from either of the process water supplies 106A and 106B may be used to rinse the food. Accordingly, the food generally follows the arrows depicted in FIG. 1 when flowing through the food processing system 100.

One or more pumps may be included within the food processing stages 104A and 104B for pumping the process water within the food processing stages 104A and 104B, between the food processing stages 104A and 104B, into the food processing stages 104A and 104B, and/or out of the food processing stages 104A and 104B. For example, with respect to the first food processing stage 104A, one or more pumps may be included to pump the process fluid from the process water supply 106A to the food wash zone 110A. A first pump 122A may be used to pump the process water from the process water supply 106A to the entry point 112A of the food wash zone 110A, and a second pump 124A may be used to pump the process water from the process water supply 106A to the turbulence zone 116A of the food wash zone 110A.

In the food processing system 100 illustrated in FIG. 1, the water control system 102A is shown as positioned between or in fluid communication with the process fluid pumped by the pump 122A to the entry point 112A of the food wash zone 110A. However, the present disclosure is not so limited, as the water control system 102A may be positioned anywhere within the food processing system 100. That is, the water control system 102A may be in fluid communication with any desired portion of the food processing system 100 to receive samples of any of the process water used within the food processing system 100. The water control system 102A measures one or more properties of the process water used within the food processing system 100. In some embodiments, the water control system 102A may measure properties of the process water used within the food processing stage 104A. The water control system 102A may be used to compare the measured properties of the process water with predetermined or desired values for the process water, and the water control system 102A may then be able to add chemicals, raise or lower the temperature, and/or make other adjustments to the process water, according to aspects of the present disclosure.

For example, as food is processed through the food processing stage 104A and clean water is added to the food processing stage 104A, the process water may become diluted and thus have a lower concentration of desired chemicals. The water control system 102A may be used to monitor and measure one or more properties of the process water used within the food processing system 100, such as via a sensor (discussed more below), and then determine and add a concentrated wash solution into the process water based upon the measured property of the process water. In an embodiment in which the water control system 102A is used to monitor and measure chlorine concentration and/or pH within the process water, the concentrated wash solution may include one or more of a concentrated chlorine solution, a concentrated acidic solution, and/or a concentrated basic solution.

In one or more embodiments, the water control system 102A may include or be used with a pump 108A for pumping the concentrated wash solution 105A (e.g., from a reservoir 109A) into the process water. In the example of FIG. 1, the water control system 102A is used to control pumping of the concentrated wash solution 105A into the process water via the process water supply 106A. The water control system 102A may also include a control unit (e.g., control unit 260 illustrated in FIGS. 2A and 2B) that receives a signal from the sensor (e.g., sensor 230 illustrated in FIGS. 2A and 2B), in which the control unit may generate a control signal 107A for adding the concentrated wash solution 105A to the process water. The control unit may be used to determine and control an amount of concentrated wash solution 105A to add to the process water, a time interval for pumping the concentrated wash solution 105A into the process water, and/or a rate for pumping the concentrated wash solution 105A into the process water. A water control system 102A or 102B, or a control unit thereof, that may be used in accordance with the present disclosure may be the Automated SmartWash Analytical Platform (ASAP)™, available from SmartWash Solutions, LLC of Salinas, California, and as described within U.S. Patent Application Publication No. 2018/0093901 to Brennan et al., filed on Oct. 3, 2017 and entitled "System for Controlling Water Used for Industrial Food Processing," which is incorporated by reference herein in its entirety.

The water control systems 102A and 102B may be configured to receive and/or store user input data, as well as historical databases and analyses that can be used to generate the control signal(s). The control signal(s) may also be generated based on the collected data, stored data, analysis, user input, a combination of data types, and/or other related data. Further, the control signal(s) may also be generated for removal of fouling of the sensors and related components based on the collected data, stored data, analysis, user input, a combination thereof, and/or other related data. Additionally, the control signals may further include scheduling the removal of the fouling based on the collected data, stored data, analysis, user input, a combination thereof, and/or other related data.

According to one or more cases, a number of elements are included in the water control systems 102A and 102B for a value-added food processing system 100. Some of these elements may relate to monitoring process water attributes, while others may relate to the performance of items used for monitoring the water attributes. Other elements may relate to monitoring the status of the processing of the food. For example, in some cases, temperature monitoring for correcting pH measurements and chlorine measurements, based on projected values of both at various temperatures, may be provided.

In some cases, another element that may be included in the food processing system 100 is a relay to stop product feed (i.e., movement of food into the food processing system) if chlorine is out of specification for either of the food processing stages 104A and 104B. Additionally or alternatively, product feed may be halted if pH is outside of the desired range in either of the food processing stages 104A and 104B.

According to one or more cases, a sensor fouling control device (e.g., sensor fouling control device 248, described below with reference to FIG. 2A) performing fouling removal processes may be included.

Fault trapping in data analysis may be used to monitor the water flow by a pH electrode and a chlorine electrode (e.g., electrodes 244, described below with reference to FIG. 2A). In other cases, other fouling control devices such as clean-in-place embodiments may be provided that include flushing an electrode/sensor with a liquid wash solution, such as an acid solution or some other food safe cleaning agent. A single clean-in-place device may be provided that is connected to each electrode such that the device is able to provide the cleaning gas and/or liquid (e.g., air) as described herein. In another case, the clean-in-place device may be configured such that the device can be connected when needed and disconnected from each electrode/sensor when not needed. In another case, each electrode/sensor may have its own specific clean-in-place device connected to the electrode/sensor. The clean-in-place device may therefore contain cleaning solution that is specifically tailored for the electrode/sensor. Moreover, the device may further provide a calibration solution when selected. Additionally, in some cases, when the clean-in-place device provides pressurized gas for cleaning, the pressure can be tailored specifically for the electrode/sensor to which the device is connected.

According to some cases, another element that may be included in the water control system(s) is a relay that stops chlorine addition if the pH exceeds a threshold. For example, facility safety may be enhanced if there is a relay provided that can stop chlorine addition if the pH exceeds 7, which can be defined as a domain outside of the normal operating conditions. Similarly, one can set a lower bound on the pH to prevent or reduce the hazards of chlorine outgassing.

One or more sensors and controllers may be added to a product feed control loop of the food processing system 100 to more stringently control the proceeding operations in accordance with one or more cases. Additionally, full feedback may be reported to the controller(s) (e.g., control unit 260, described with reference to FIG. 2A, below) about the status of product feed to assure that the control relay is not circumvented and prevent inappropriate processing. The controller assesses whether the product feed is as expected given the status of the water chemistry.

According to one or more cases, a proportional-integral-derivative (PID) controller, which may be an example of control unit 260 (described below, with reference to FIG. 2A), with, for example, 5 to 10 second control loops may be used to control addition of chemicals to the process water in the food processing system 100. This allows the food processing system 100 to maintain the desired control and consistency in the process water chemistry. The PID controller may further allow for slow and fast acting sanitizer changes and better tuning of control. Further, according to one or more embodiments, controlling the speed of response provides the control unit (e.g., the control unit 260, described below with reference to FIG. 2A) the ability to vary the degree of anticipation and response that corresponds with the produce wash equipment specification and/or produce characteristics. For example, cleaning carrots can sometimes be done with a longer response time to chemical amount shifts, while washing onions may involve a faster response to changes detected by one or more sensors. The control unit may set pump frequency and/or rate and stroke length to control the amount of chemical added to the process water, as well as the timing. Further, a time interval may be selected for pumping based on the sensor (e.g., sensor 230, described below with reference to FIG. 2A) provided information.

According to one or more cases, sensor fouling mitigation with limited interruption of data for cleaning may be provided that improves the operation of the food processing system 100. According to one or more embodiments, a number of different elements can be provided that increase effectiveness. For example, switching from an elapsed time clock to a daily clock for chlorine electrode electrochemical cleaning may be provided. This change in clock cycle may ensure that the chlorine electrodes may start each day of production without accumulated fouling.

According to another embodiment, another element that may be provided is feedback to the controller to confirm that a sensor (e.g., a chlorine electrode) was cleaned, allowing verification rather than assuming the cleaning cycle was complete.

Further, according to another embodiment, another element that may be included is a designed-for-purpose filter (e.g., filter 234, described below with reference to FIG. 2A). This may include a set of cascading filters that may include a first filter connected in series with a second filter. These filters may be of a tangential flow design to extend operating time. This may allow greater tolerance for interfering materials including fats and oils that are present in meat (e.g., poultry) operations.

Further, with respect to the second food processing stage 104B, one or more pumps may be included to pump the process fluid from the process water supply 106B to the food wash zone 110B. A first pump 122B may be used to pump the process water from the process water supply 106B to the entry point 112B of the food wash zone 110B, and a second pump 124B may be used to pump the process water from the process water supply 106B to the turbulence zone 116B of the food wash zone 110B. Though not so limited, the second water control system 102B, which may be similar to the first water control system 102A, may be positioned between or in fluid communication with the process fluid pumped by the pump 122B to the entry point 112B of the food wash zone 110B.

In one or more embodiments, the food processing system 100 may include a process water supply cooling element 126, such as a chiller, to cool the process water to a predetermined temperature to facilitate processing of the food through the food processing system 100. In an embodiment in which multiple food processing stages are used to process food, the stages may utilize different temperatures or ranges to facilitate the food processing. In the embodiment of FIG. 1, the process water supply cooling element 126 is shown as included within the second food processing stage 104B, though the process water supply cooling element 126 may additionally or alternatively be included within the first food processing stage 104A and/or other stages. The process water supply cooling element 126 may receive the process water from the process water supply 106B, such as through a pump 128A, cool the process water, and then provide or pump the chilled process water back to the process water supply 106B through a pump 128B (or to another portion of the second food processing stage 104B). In such an embodiment, the process water of the second food processing stage 104B may be cooled to or maintained at a temperature between about 34° F. and about 45° F. Further, the process water of the first food processing stage 104A may be cooled to or maintained at a temperature between about 60° F. and about 70° F. Thus, the process water used in the first food processing stage 104A may be maintained at a different temperature or temperature range than the process water used in the second food processing stage 104B.

The food processing system 100 may be used to process any type of food product, but particularly may be used for processing dairy products, protein-based foods, or protein-dense foods. More particularly, the food processing system may be used to process meat, such as fish or poultry. These foods may be particularly dense with lipids and/or other adhering materials, which may foul and/or otherwise negatively affect the water control systems 102A and 102B and sensors included therein. Lipid fouling may be difficult to mitigate, as lipids tend to be oily and waxy, may deposit on surfaces, and may occlude filters. The lipids may restrict flow in pipes and otherwise throughout the food processing system 100 and may cover measuring surfaces of the water control systems 102A and 102B. For example, as lipids from poultry (e.g., fat, though oil and other organic compounds are considered) tend to have a similar bulk density as water, filtration of the lipid from the water may be difficult or inadequate, such as when conditioning or filtering process water.

Lipids in process water may clump together in tanks and conveyance systems, accumulate on the interior of tubing, orifices, and instrumentation, and/or prevent the accurate measurement of flow rates and other properties of the process water and the food within the food processing system 100. Further, colder temperatures, such as presented through the process water supply cooling element 126, tend to increase the fouling caused by lipids, such as fouling of sensors in the water control systems 102A and 102B within the food processing system 100. In an embodiment in which the water control systems 102A and 102B are used for monitoring chlorine and/or pH levels within the food processing system 100, the accuracy of the sensors included within the water control systems 102A and 102B may become unacceptable or inaccurate (e.g., outside of industry standards) in as little as one hour of use. The lipids, such as poultry fat, may accumulate on the sensor (e.g., an electrode), such that the sensor is insulated or blinded by the lipid accumulation on the sensor, which can cause the sensor to make inaccurate measurements. If the sensor is providing inaccurate measurements, the water control systems 102A and 102B may not be able to accurately and actively control chlorine and/or pH levels for the process water within the food processing system 100.

For example, the water control systems 102A and 102B may not actively be able to control the hygiene of the food, the process water, or the equipment within the food processing system 100 due to the water control systems over- or under-dosing additions of chlorine and acid (e.g., to alter pH of the process water) to the process water. This may result in gassing (e.g., release of noxious gases from the process water) within the food processing system, building evacuation, food or product losses, processing or production stoppages, and/or other health or safety issues. Further, while manual intervention may be relied upon to clean the sensors of the water control systems 102A and 102B, manual intervention may be too labor-intensive, may still lead to processing or production stoppages, and otherwise may be inefficient or ineffective.

In one or more embodiments in accordance with the present disclosure, a temperature adjustment element may be used to prevent or at least mitigate the effects of lipid fouling. The temperature adjustment element may be positioned upstream of a sensor within a water control system to adjust the temperature of the process water received and measured by the sensor, in accordance with the present disclosure. The temperature adjustment element may be used to heat the process water received by the sensor in one or more embodiments, or may be used to cool the process water received by the sensor in one or more embodiments.

Example Water Control Systems

Figure 2A:
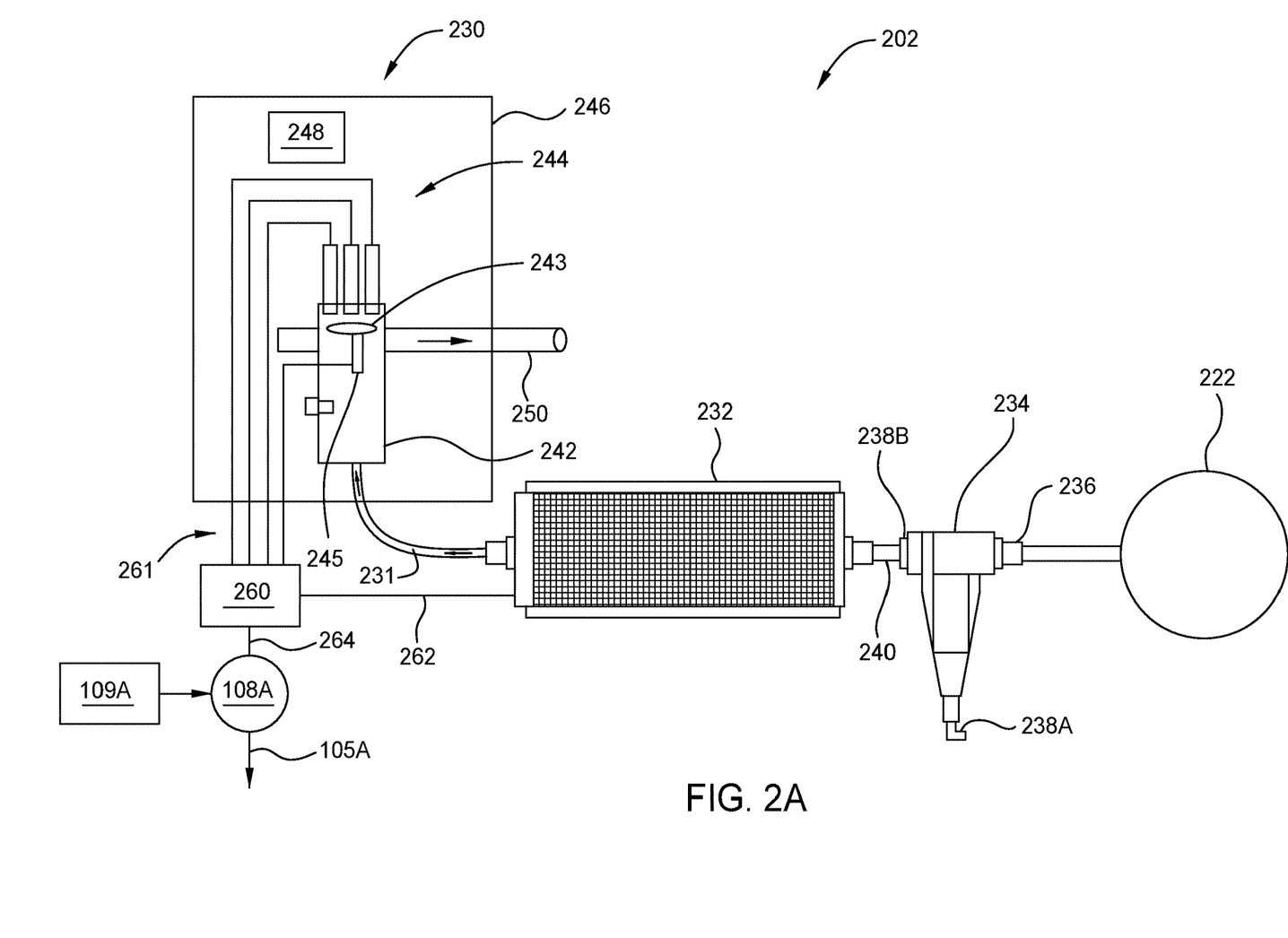
FIG. 2A is a schematic diagram of a water control system using a heating element as a temperature adjustment element, in accordance with certain aspects of the present disclosure.

FIG. 2A is a schematic diagram of a water control system 202 using a heating element as a temperature adjustment element, in accordance with certain aspects of the present disclosure. The water control system 202 may be used within a food processing system (e.g., system 100) and is an example of the water control systems 102A and 102B illustrated in FIG. 1. Thus, a pump 222 is shown that may be used to pump process water in a food processing system. Further, the water control system 202 may have additional or alternate components or arrangements than those shown in FIG. 2A, so those having skill in the art will appreciate that the present disclosure is not limited to only the components or the arrangement shown in FIG. 2A.

The water control system 202 includes a sensor 230, a temperature adjustment element 232, a control unit 260, and a filter 234. The filter 234 may be positioned upstream of the temperature adjustment element 232 in this embodiment, such as to filter out contaminants from the process water before reaching the temperature adjustment element 232. The temperature adjustment element 232 is positioned between the filter 234 and the sensor 230 to adjust a temperature of the process water received by the sensor 230. The sensor 230 is then used to measure a property of the temperature-adjusted process water.

In this embodiment, the filter 234 is shown as having multiple outlets, though the present disclosure is not so limited. For example, the process water pumped by the pump 222 and received into the filter 234 through an inlet 236 may be split and exit the filter 234 through outlets 238A and 238B. The process water exiting the filter 234 through the outlet 238A may return to a wash line flow path, such as to be pumped into a food wash zone 110A or 110B of a food processing stage 104A or 104B, respectively. The process water exiting the filter 234 through the outlet 238B may proceed along a process water monitoring flow path 240 for monitoring and control by the water control system 202. In one embodiment, the pump 222 may be able to pump between about 4 gal/min and 6 gal/min. The filter 234 may split the flow of the process water such that about 0.25 gal/min is received into the process water monitoring flow path 240.

As shown in FIG. 2A, substantially all of the process water directed along the process water monitoring flow path 240 may be received into the temperature adjustment element 232. The temperature adjustment element 232 is used to adjust the temperature, such as by heating, of the process water received through the process water monitoring flow path 240. The temperature adjustment element 232 may be controlled by the control unit 260, as described in more detail, below. The temperature-adjusted process water may be provided to the sensor 230, as the temperature adjustment element 232 is positioned upstream of the sensor 230 within the process water monitoring flow path 240. In one embodiment, the temperature adjustment element 232 is positioned immediately upstream of the sensor 230 within the process water monitoring flow path 240, such that no other components interact with the process water between the temperature adjustment element 232 and the sensor 230, except conduit 231 (e.g., piping) to route the process water from the temperature adjustment element 232 to the sensor 230.

The temperature adjustment element 232 may adjust the temperature of the process water to reduce the fouling or other effects of the process water, and particularly the lipids contained in the process water, upon the sensor 230. In one embodiment, the temperature adjustment element 232 may be used to heat the process water, and thus heat the lipids included within the process water. For example, the temperature adjustment element 232 may include a heating element (e.g., a water heater) to heat the process water to a range between about 100° F. and about 180° F. For a flow between about 800 milliliters per minute (mL/min) to about 1200 mL/min, a water heater with a power capacity of about 1200 watts to about 2400 watts may be employed. By heating the process water, the lipids may be softened or liquefied, depending on the temperature, to reduce the accumulation on and fouling of the sensor 230. If the lipids are softened, such as by heating the process water to above about 100° F., and more particularly to a range between about 100° F. and about 110° F., this may facilitate removal or cleaning of lipid accumulation on the sensor 230.

Additionally or alternatively to softening the lipids, the temperature adjustment element 232 may heat the process water to liquefy the lipids included within the process water. If the lipids are liquefied, such as by heating the process water to at least 130° F., and more particularly to a range between about 130° F. and about 180° F., this may prevent the accumulation of lipids or other adhering material on the sensor 230. In such an embodiment, the lipids may pass through the sensor 230 before cooling enough to accumulate on the sensor 230 or the water control system 202 altogether.

Referring still to FIG. 2A, and as discussed above, the sensor 230 is used to measure a property of or with respect to the process water and to generate a signal with respect to the measured property. Thus, in one embodiment, particularly with reference to the food processing industry, the sensor 230 may be used to measure a pH and/or a chlorine concentration (e.g., in parts-per-million (ppm)) of the process water. As shown in FIG. 2A, the sensor 230 includes a flow cell 242 that receives the process water from the temperature adjustment element 232. Further, the sensor 230 includes one or more electrodes 244 in this embodiment that are coupled to the flow cell 242 and are in fluid communication with the process water within the flow cell 242. The electrodes 244, for instance, may be positioned in or extend at least partially into the flow cell 242 to be in direct contact with the process water within the flow cell 242. Additionally or alternatively, the sensor 230 may be used to measure a property of the process water through a window 243, such as for optically measuring a property. In such an embodiment, the flow cell 242 may have one or more windows 243 formed therein, and an optical sensor 245 can be included within the sensor 230 to measure the property through the window. Further, the sensor 230 may include a protective sanitation cabinet 246 to protect other components of the sensor 230 and/or prevent contamination of these other components of the sensor 230 (e.g., protect the sensing components of the sensor 230, such as the electrodes 244 or the optical sensor 245).

In one or more embodiments, a sensor fouling control device 248 may be operably coupled to or included in the sensor 230 to reduce or remove lipid accumulation on the sensor 230 or a component of the sensor (e.g., a window 243 into a flow cell 242 of the sensor). For some embodiments, the sensor fouling control device 248 may be controlled by the control unit 260, while in other embodiments, the sensor fouling control device may have its own processor or be controlled from an additional control unit, which may be part of or external to the water control system 202. The sensor fouling control device 248 may include a cleaning air blast device, such as to deliver a filtered and oil-free burst of air to the sensor 230, to dislodge lipids or other adhering material on the sensor 230. Other types of sensor fouling control devices may employ methods and techniques that include, but are not limited to, managing stream flow dynamics (e.g., to provide continuous sweeping action), mechanical scouring, causing counter or backflow, filtration, and sedimentation. Such techniques of the sensor fouling control device 248 may be applied directly to the sensor 230, or may be applied upstream of the sensor 230, such as between the temperature adjustment element 232 and the sensor 230.

Referring still to FIG. 2A, a waste water flow path 250 may be included with the water control system 202 to facilitate disposal of the process water used within the water control system 202. For example, the waste water flow path 250 may be an outlet from the sensor 230 to dispose of the process water received by and measured by the sensor 230. By designing the water control system to dispose of the process water (i.e., to not return the process water to the food processing system) received by the water control system 202, the water control system 202 and components thereof (e.g., the sensor 230 and the temperature adjustment element 232) can be used in the food processing system without being approved for contact with food used within the food processing system. However, the present disclosure is not so limited, as the water control system 202 may route the process water back into the food processing system. In such an embodiment, the process water that exits the sensor 230 may be routed to the process water supply (e.g., process water supply 106B of food processing system 100, illustrated in FIG. 1) and/or the food wash zone of the food processing system (e.g., food wash zone 110B of food processing system 100).

The control unit 260 obtains readings from the electrodes 244 and/or optical sensor 245 via one or more wires 261 and/or optical fibers and may generate one or more control signal(s) 107A (illustrated in FIG. 1) to cause addition of the concentrated wash solution 105A (illustrated in FIG. 1) to the process water supply 106A (illustrated in FIG. 1, above). The control unit 260 may be used to determine and control an amount of concentrated wash solution 105A to add to the process water, a time interval for pumping the concentrated wash solution 105A into the process water, and/or a rate for pumping the concentrated wash solution 105A into the process water. A water control system, or a control unit thereof, that may be used in accordance with the present disclosure may be the Automated SmartWash Analytical Platform (ASAP)™, available from SmartWash Solutions, LLC of Salinas, California, and as described within U.S. Patent Application Publication No. 2018/0093901 to Brennan et al., filed on Oct. 3, 2017 and entitled "System for Controlling Water Used for Industrial Food Processing."

For some embodiments, the control unit 260 may send, via wire 262, a control signal to the temperature adjustment element 232 to adjust the temperature of the process water exiting the temperature adjustment element. The control unit 260 may also send, via wire 264, one or more other control signals to the pump 108A or 108B, as discussed above with reference to FIG. 1. While the control unit 260 is shown obtaining readings via wires 261, the present disclosure is not so limited, and the control unit 260 may additionally or alternatively obtain the readings via an optical fiber or a wireless connection (e.g., Bluetooth®). Similarly, while the control unit 260 is shown sending control signals via wires 262 and 264, the present disclosure is not so limited, and the control unit 260 may send the control signals to the temperature adjustment element 232 and/or to the pump 108A or 108B (illustrated in FIG. 1, above) via an optical fiber or a wireless connection.

For some embodiments, the temperature adjustment element 232 may be retrofitted or otherwise attached to a water control system, such as the ASAP™, in order to protect the sensor 230. For example, one could sever the flow path 240 and couple the temperature adjustment element 232 into the flow path 240 and to conduit 231 using fittings for fluid-tight sealing of the flow path 240, temperature adjustment element 232, and conduit 231.

Figure 2B:
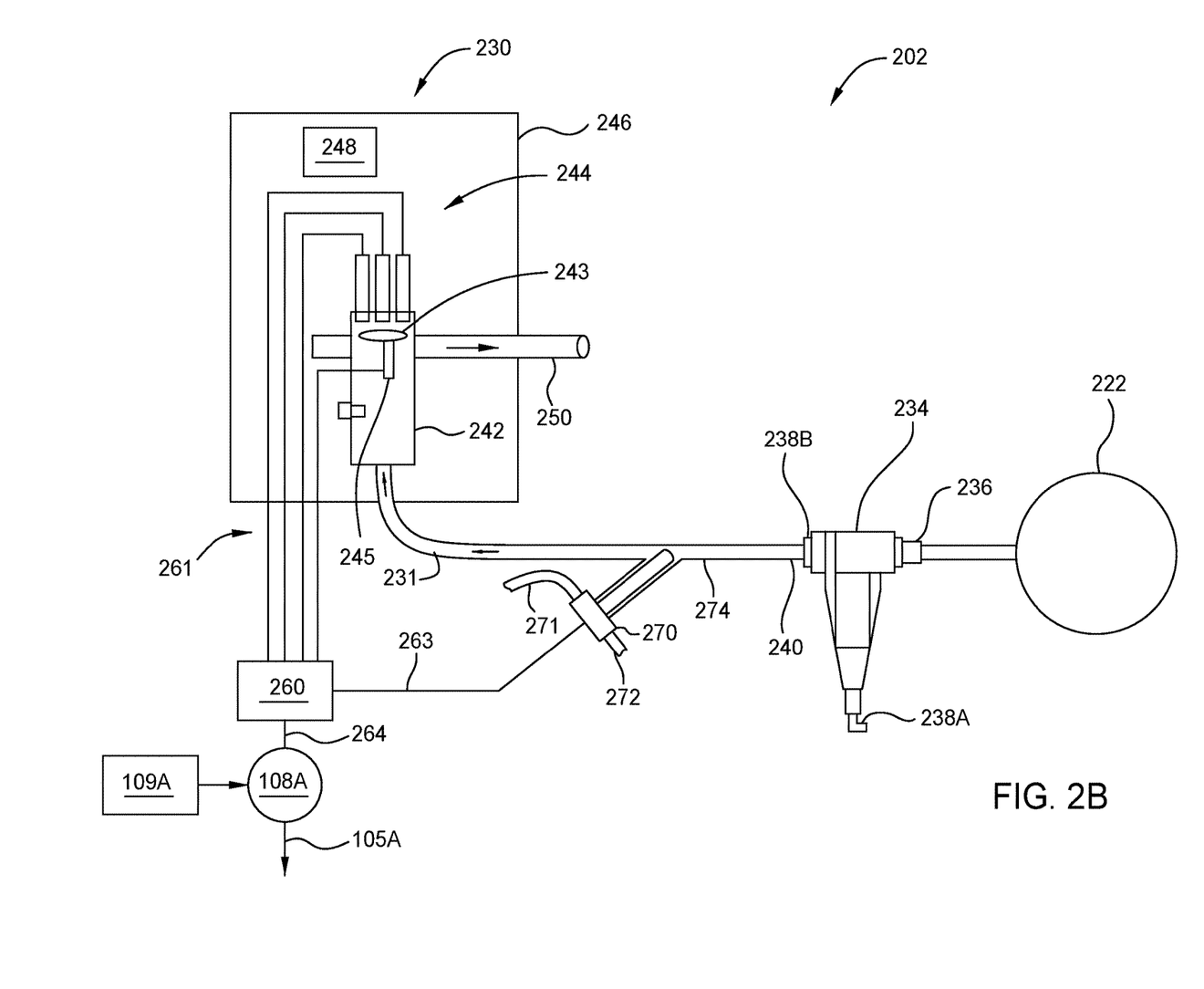
FIG. 2B is a schematic diagram of a water control system using a cooling element as the temperature adjustment element, in accordance with certain aspects of the present disclosure.

FIG. 2B is a schematic view of a water control system 203 using a cooling element 270, in accordance with certain aspects of the present disclosure. The water control system 203 may be used within a food processing system (e.g., system 100) and is an example of the water control systems 102A and 102B illustrated in FIG. 1. Water control system 203 is similar to water control system 202, illustrated in FIG. 2A, with many of the same or similar components. Therefore, only components of water control system 203 that may differ from the components of water control system 202 are described.

In water control system 203, a cooling element 270 (which is a type of, and may also be referred to as a, temperature adjustment element), such as a cold trap or a cold finger, is inserted into the process water monitoring flow path 240, or the process water monitoring flow path 240 may flow through the cooling element. A cooling fluid (e.g., cold water, alcohol, or a refrigerant) may enter the cooling element 270 via a tube 271 and exit the cooling element via another tube 272. The cooling element 270 may cool the process water and thus cool the lipids included within the process water. The cooling element 270 may be used to condense and entrap the lipids in the process water before the lipids reach the sensor 230. If the lipids are cooled, such as by cooling the process water to below about 40° F., and more particularly to a range between about 33° F. and about 35° F. (i.e., just above the freezing point of water), this may facilitate removal of lipids from the process water before the lipids can reach the sensor 230.

For some embodiments, the control unit 260 sends, via wire 263, a control signal to the cooling element 270 to adjust the temperature of the process water exiting the flow path 240 before reaching the sensor 230. The control unit 260 may also send, via wire 264, one or more other control signals to the pump 108A or 108B, as discussed above with reference to FIG. 1. While the control unit 260 is shown obtaining readings via wires 261, the present disclosure is not so limited, and the control unit 260 may additionally or alternatively obtain the readings via optical fiber or a wireless connection (e.g., Bluetooth®). Similarly, while the control unit 260 is shown sending control signals via a wire 263, the present disclosure is not so limited, and the control unit 260 may send the control signals to the cooling element 270 and/or to the pump 108A or 108B (illustrated in FIG. 1, above) via an optical fiber or a wireless connection.

For some embodiments, the cooling element 270 may be retrofitted or otherwise attached to a water control system, such as the ASAP™, in order to protect the sensor 230. For example, one could sever the flow path 240 and couple a housing 274 suitable for holding the cooling element 270 into the flow path 240 and conduit 231 using fittings for fluid-tight sealing of the flow path 240, housing 274, and conduit 231.

Figure 3:
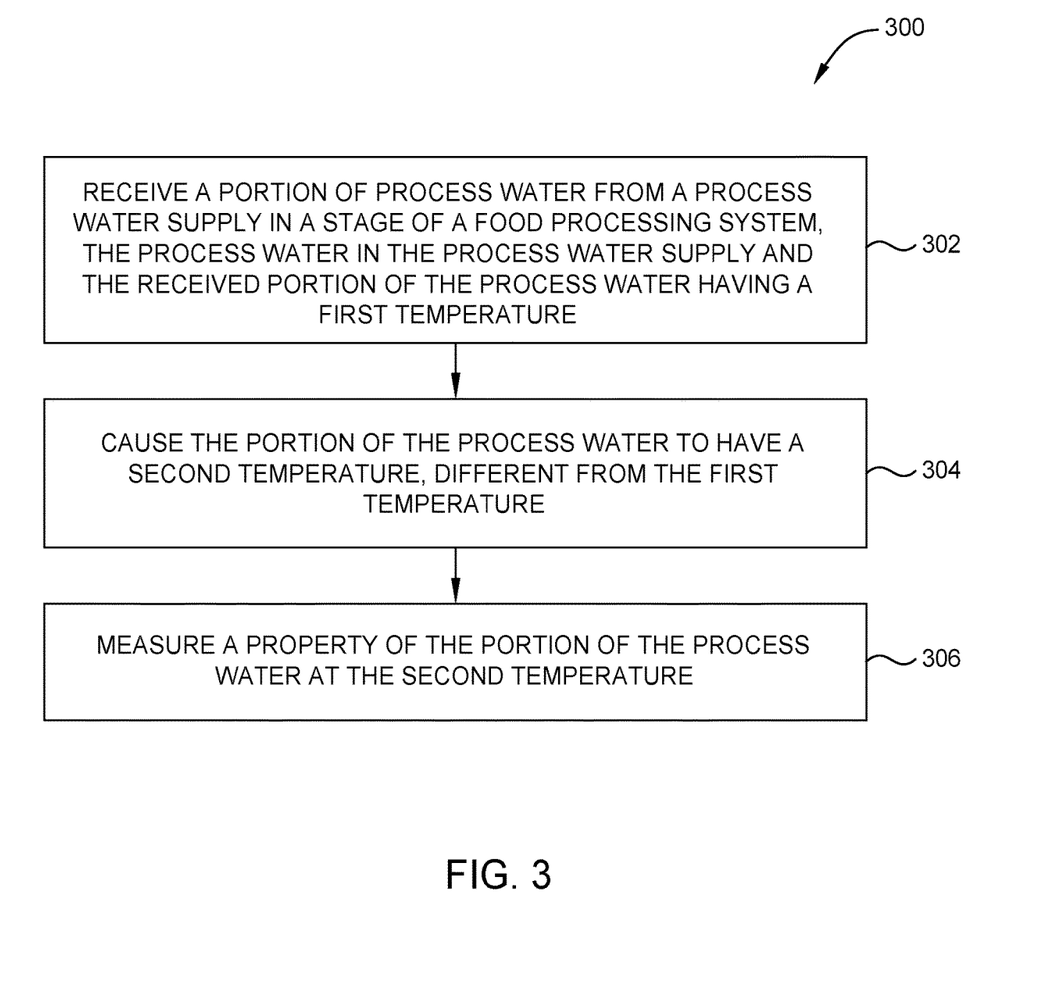
FIG. 3 is a flow diagram of example operations for measuring a property of process water, in accordance with certain aspects of the present disclosure.

FIG. 3 is a flow diagram of example operations 300 of sensing a fluid (e.g., process fluid) with mitigated sensor fouling. The operations 300 may be performed by a water control system (e.g., the water control system 202 or 203 shown in FIG. 2A or 2B, respectively).

The operations 300 may begin at block 302 with the water control system receiving a portion of the process water from a process water supply (e.g., process water supply 106A or 106B) in a stage (e.g., stage 104A or 104B) of a food processing system. The received portion of the process water has a first temperature. In certain aspects, the process water in the process watery supply also has the first temperature. For example, the water control system 202 (illustrated in FIG. 2) may receive (e.g., via the inlet 236) a portion of the process water from the process water supply 106A of the food processing system 100 (illustrated in FIG. 1), the received portion of the process water having a first temperature (e.g., 37° F.) in the stage 104A.

At block 304, the operations 300 continue with the water control system causing the portion of the process water to have a second temperature, different from the first temperature. Continuing the example from above, the temperature adjustment element 232 (illustrated in FIG. 2) of the water control system may heat the portion of the process water to a second temperature (e.g., 130° F.), different from the first temperature (i.e., the first temperature in block 302).

The operations 300 continue at block 306 with the water control system measuring at least one property of the portion of the process water at the second temperature. Continuing the example from above, a sensor (e.g., the sensor 230) may measure a property (e.g., chlorine concentration or pH) of the portion of the process water at the second temperature (i.e., the second temperature in block 304). For certain aspects, the measuring at block 306 entails using a sensor to measure the at least one property. In this case, the second temperature may be selected to reduce adhesion of lipids in the portion of the process water to one or more components of the sensor, as compared to the first temperature.

The process water in the stage of the food processing system, as described with respect to block 302, may be received into a process water monitoring flow path of the water control system. The temperature of the received portion of the process water may be adjusted, as described with respect to block 304, with a temperature adjustment element of the water control system. Further, the property of the portion of the process water may be measured, as described with respect to block 306, using a sensor that is downstream of the temperature adjustment element within the water control system.

According to certain aspects, the operations 300 may further involve the water control system filtering the portion of the process water prior to causing the portion of the process water to have the second temperature. For example, the filtering may involve filter 234 illustrated in FIG. 2.

According to certain aspects, the operations 300 may further involve the water control system cleaning a component of a sensor used to measure the property of the portion of the process water to reduce lipid accumulation on the component. For example, the cleaning may involve using sensor fouling control device 248 portrayed in FIG. 2.

The operations 300 may further include processing food in the food processing system with the process water. For example, a food processing stage of the food processing system may be used to process food, such as meat or other protein-based foods, and more particularly fish or poultry in one or more embodiments, such as by rinsing or washing the food with a wash solution. The operations 300 also may further include adding a concentrated wash solution to the process water based upon the measured property. The addition of the concentrated wash solution may be to bring the process water to a predetermined or desired chemical concentration (e.g., a desired chlorine concentration) or a desired pH. In such an embodiment, the sensor of the water control system may be used to facilitate pumping and adding a concentrated wash solution to the process water used within the food processing system. For example, the water control system may include a pump and/or the concentrated wash solution for pumping and adding the concentrated wash solution, or a pump and/or the concentrated wash solution may be in communication with the sensor to separately pump and add the concentrated wash solution.

In accordance with one or more embodiments, the present disclosure may be able to improve the effectiveness of sensors, particularly within a food processing system. Sensors within a food processing system may be prone to fouling, such as from lipids or other adhering material included within the process water of the food processing system. Embodiments in accordance with the present disclosure may be used to reduce such fouling of sensors, such as within a water control system, or to facilitate the cleaning of such sensors, thereby improving the effectiveness of the sensors. Further, embodiments in accordance with the present disclosure may be used to reduce or eliminate manual interaction with a sensor or a water control system, thereby increasing the efficiency of the interaction with and reducing the potential downtime of the sensor and water control system.

While the present disclosure has been described in detail in connection with only a limited number of embodiments, it should be readily understood that the present disclosure is not limited to such described embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment described as the best mode contemplated for carrying out this present disclosure, but that the present disclosure will include all embodiments falling within the scope of the claims.

The invention claimed is:

1. A water control system in a food processing system, comprising:
   a flow path coupled to a process water supply in a stage of the food processing system;
   a temperature adjustment element disposed in the flow path and having an inlet and an outlet, the temperature adjustment element being configured to:
      receive, at the inlet of the temperature adjustment element, a first portion of process water from the process water supply via the flow path, wherein the process water in the process water supply and the received first portion of the process water have a first temperature; and
      cause the first portion of the process water at the outlet of the temperature adjustment element to have a second temperature, different from the first temperature; and
   a sensor coupled to the outlet of the temperature adjustment element and configured to measure at least one property of the first portion of the process water received from the outlet of the temperature adjustment element, wherein the first portion of the process water measured by the sensor is not returned to the process water supply, wherein a second portion of the process water is directed away from the inlet of the temperature adjustment element, and wherein the flow path is configured to direct the second portion of the process water back to the process water supply.

2. The water control system of claim 1, wherein the second temperature is configured to reduce adhesion of lipids in the first portion of the process water to one or more components of the sensor, compared to the first temperature.

3. The water control system of claim 1, further comprising:
   a filter positioned upstream of the temperature adjustment element and configured to filter the first portion of the process water prior to the first portion of the process water being received by the temperature adjustment element.

4. The water control system of claim 1, wherein the temperature adjustment element comprises a heating element.

5. The water control system of claim 4, wherein the heating element is configured to heat the first portion of the process water to at least 100° F. and below 130° F.

6. The water control system of claim 1, wherein the temperature adjustment element comprises a cooling element.

7. The water control system of claim 6, wherein the cooling element comprises a cold trap configured to condense and entrap lipids in the first portion of the process water.

8. The water control system of claim 6, wherein the cooling element is configured to cool the first portion of the process water to below 40° F.

9. The water control system of claim 1, wherein:
   the at least one property of the first portion of the process water measured by the sensor comprises a pH or a chlorine concentration of the process water; and
   the sensor is configured to generate a signal indicative of the at least one measured property.

10. The water control system of claim 9, wherein the sensor comprises:
    a flow cell positioned to receive the first portion of the process water from the temperature adjustment element; and
    an electrode coupled to the flow cell and in fluid communication with the first portion of the process water within the flow cell.

11. The water control system of claim 1, wherein the sensor comprises:

one or more sensing components; and a protective sanitation cabinet housing the one or more sensing components.

12. The water control system of claim 1, further comprising a sensor fouling control device operably coupled to or included in the sensor and configured to reduce lipid accumulation on a component of the sensor.

13. The water control system of claim 1, wherein the sensor is configured to measure the at least one property of the first portion of the process water in the flow path.

14. The water control system of claim 6, wherein the cooling element is configured to cool the first portion of the process water to at least 33° F. and below 35° F.

15. The food processing system comprising the water control system of claim 1, the food processing system further comprising:

the stage for processing a food product;

the process water supply configured to supply the process water to the stage; and a pump configured to pump a concentrated wash solution into the process water in the food processing system based upon the at least one measured property of the first portion of the process water.

16. The food processing system of claim 15, wherein the concentrated wash solution comprises at least one of a concentrated acidic solution, a concentrated basic solution, or a concentrated chlorine solution.

17. The water control system of claim 1, wherein the temperature adjustment element has a single inlet.

18. The water control system of claim 1, wherein the sensor is coupled to the outlet of the temperature adjustment element such that all of the first portion of the process water at the outlet of the temperature adjustment element is directed to the sensor.

* * * * *